UNITED STATES PATENT OFFICE.

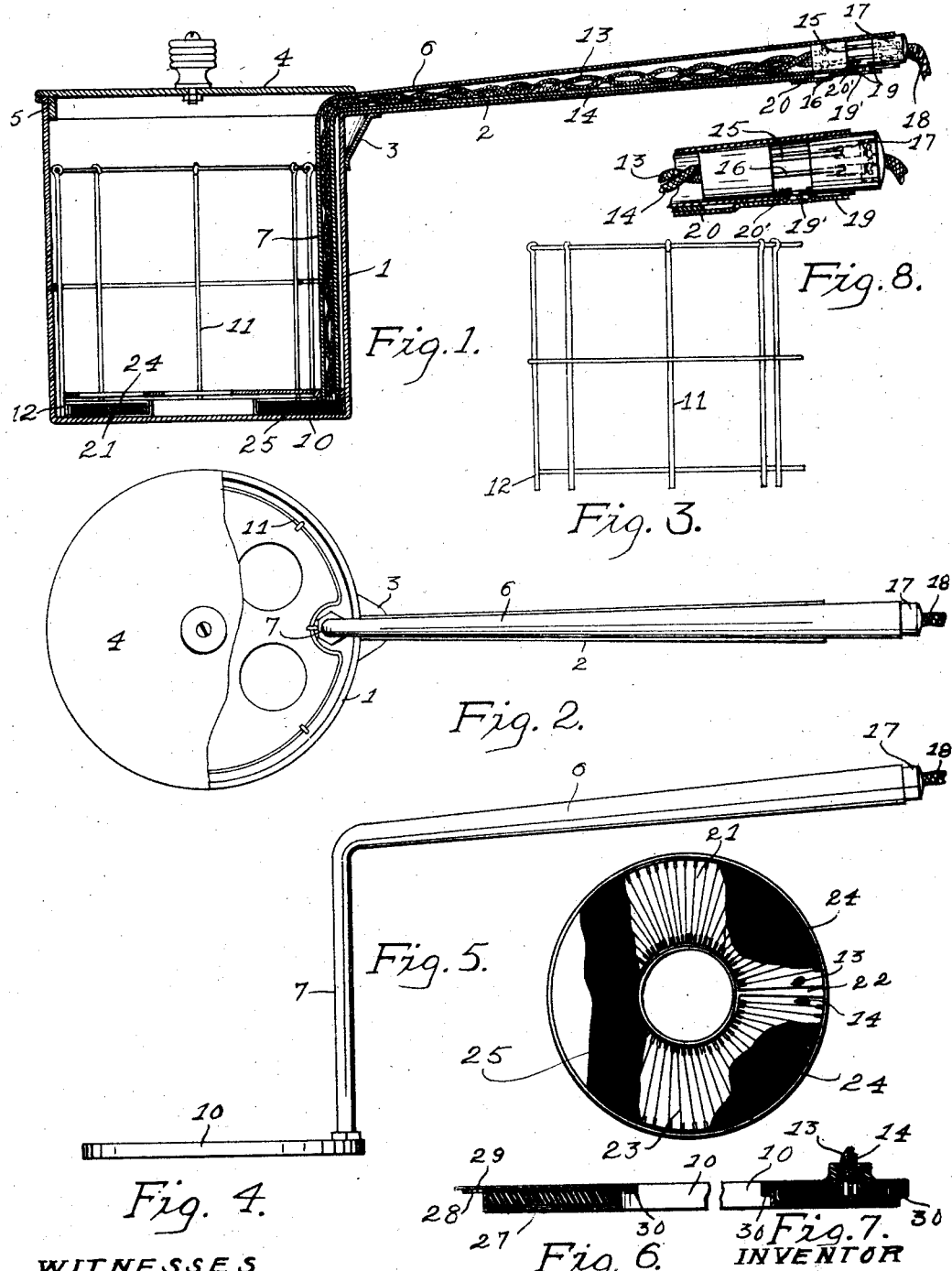

ANSEL C. HULBERT, OF SAN FRANCISCO, CALIFORNIA.

ELECTRICAL HEATER.

1,064,330. Specification of Letters Patent. Patented June 10, 1913.

Application filed April 22, 1912. Serial No. 692,404.

*To all whom it may concern:*

Be it known that I, ANSEL C. HULBERT, a citizen of the United States, residing at San Francisco, in the county of San Francisco and State of California, have invented a new and useful Electrical Heater, of which the following is a specification in such full and clear terms as will enable those skilled in the art to construct and use the same.

This invention relates to an electrical heater and its object is to provide a heater which will give the maximum heating area for the wire used.

Another object of the invention is to provide a heater of such shape as to enable it to be used for heating and cooking purposes in a vessel in such a way as to permit the vessel to be used for the ordinary cooking operations.

It will be understood that with the ordinary electrical immersion heaters, their shape is such that when placed in a suitable vessel the handle is in the way to such an extent as to make it very inconvenient to use the vessel for any other purpose than for boiling water. With this invention the handle within which the lead wires are contained is placed at the edge of the heater so that the heater may be placed within the vessel and leave the maximum area of the vessel for use.

Another object of the invention is to produce a form of electric heater which will be very easily wound and which will have its resistance wire suitably insulated, while, at the same time, bringing said wires out of the core upon which they are wound at the most convenient place for the connection thereof with the feed wires.

Another object of the invention is to provide means whereby the heater cannot be removed from the vessel in which it is ordinarily used without disconnecting the electric circuits, thus insuring the protection of the heater from accidental use when not immersed in water. It will be understood by those skilled in the art that in the case of immersion heaters that they are made to give the best heating effect when immersed in the fluid to be heated. This necessarily produces a heater which is not intended to be used unless so immersed, and therefore this safety device is applied thereto in order to avoid the accidental heating of the device unless properly immersed.

Another object of the invention is to so wind the core that the resistance wire will be in contact therewith throughout its entire length, thus preventing the wire from being overheated by any current with which it is liable to be connected.

In the drawings in which the same numeral of reference is applied to the same portion throughout the several views, Figure 1 is a vertical sectional view through the heater and the dipper used in connection therewith for heating water or for other cooking purposes, Fig. 2 is a plan view of the dipper with a portion of the cover thereof broken away, Fig. 3 is a side elevation of the cage used for boiling eggs, etc., Fig. 4 is a side elevation of the electric heater removed from the receptacle with which it is ordinarily used, Fig. 5 is a plan view of the heating element, portions thereof being broken away for purposes of illustration, Figs. 6 and 7 are sectional views of the heating element illustrating the formation of the double seam used in connection therewith, and Fig. 8 is an enlarged sectional view of the end of the heater handle showing the catch used to lock the heater and dipper together when the plug containing the feed wires is pushed into the heater handle.

The numeral 1 represents a dipper having a suitable handle 2, a brace 3 being used to strengthen the handle at the point of connection with the dipper. The dipper is provided with a cover 4 having a suitable flange 5, which flange is provided with a notch to pass over the heater handle 6. The heater handle fits the top of the dipper handle and has a portion 7 extending down into the dipper at the side thereof, the heater proper being shown at 10 and secured to the lower end of the tube 7.

Where it is desired to boil such articles as eggs or potatoes, the cage 11 may be used, said cage having depending lugs 12 to prevent it from being displaced from the heater 10 when lifted out of the dipper 1 by means of the heater. The electric wires 13 and 14 are connected with the terminals 15 and 16 near the end of the heater handle and a plug 17 is used to connect said terminals with the source of electric current supply, a cable 18 being connected with said plug 17.

Slidable on the end of the handle 6 below the terminals 15 and 16 is a catch 19 which is pushed forward by the insertion of the plug 17 in its place and which locks the handle 2 and the handle 6 together as indicated at 20. The rivet 19' holds the catch in place and a spring 20' pushes it back when the plug is removed from the handle. It is thus impossible to remove the heater from the dipper without first withdrawing the plug 17 from the handle, whereupon the electric circuit will be broken and no possible danger of overheating the heating element 10 will occur.

The heating element comprises a core of non-conducting heat resistant material 21, a compound of asbestos fiber being most suitable for this purpose. This core is a flat annulus having a saw-cut 22 therein to provide an air gap between the two ends of the lead wires 13 and 14. The annulus 21 has a series of notches cut in its inner and outer edges and the resistance wire 23 is wound around the same to lie radially as indicated in the sectional plan view of the heater. The two ends of the resistance wire 23 are passed through holes in the annulus 21 adjacent the saw-cut therein while the feed wires 13 and 14 are passed through small holes adjacent said saw-cut, as near the outer edge as possible after which the resistance wire is wound about the feed wires below the annulus, thus preventing it from being pulled out of said annulus and thus disconnecting the feed wires and resistance wire. This form of core for the resistance wire presents the maximum area of heating surface for material used, both as to the wire and the annulus since it is wound on both sides of the annulus and both sides thereof give over heat to the liquid in which the heater is immersed. A further advantage of this type of core lies in the fact that the lead wires touch the annulus at two parts separated by the air-gap 22, thus preventing the possibility of a short circuit, and since the resistance wire is wound entirely around the annulus it may be easily connected with the lead wires on the opposite sides of the air-gap and at a point as near the outer edge as possible.

It will be observed that the resistance wire lies in notches cut in the inner and outer edges of the annulus 21, it is, therefore, insulated at the edges thereof and it only remains to insulate it above and below, this insulation being mica disks 24 and 25 as shown in the sectional plan view of the heater.

The annulus 21 and the mica disks after having the wires properly placed, are placed within a shallow metallic cup 27. This cup is flanged as shown at 28 at its inner and outer edges and the top 29 is placed thereon. This top is then flanged downwardly around the flange 28, whereupon said flange is then doubled in as shown at 30 to form a double seamed water tight joint with the shallow cup in which the annulus 21 and mica disks are placed. The top 29 is flanged upwardly adjacent one edge and the interior of said flange is threaded to receive the tube 9, within which the feed wires are placed.

In use the heater is placed in the dipper and water or other liquid to be heated is placed therein. The plug 17 may then be inserted in the handle of the heater, which act will automatically lock the heater handle to the dipper handle, whereupon the current may be turned on and the material in the dipper will be heated for any length of time it may be desired.

When it is desired to boil eggs or other materials of this kind, they may be placed in the cage used for that purpose and may be either lifted out with the cage or may be lifted out by lifting the heater and cage together, the lugs on the cage preventing it from slipping off the heater.

An advantage of this heater lies in the fact that the heating wire is covered and does not come in contact with the liquid to be heated, avoiding any dissociation of the liquid heated.

Having thus described my invention what I claim as new and desire to secure by Letters Patent of the United States is as follows:

1. In an electric heater, a flat annular case, an electric heating element in said case, a handle secured to one edge of the case and through which the lead wires to the heating element pass, a receptacle within which the heating element may be placed, a handle for said receptacle and along which the heater handle extends, and means carried by the handle for the heater to secure the same to the handle of the receptacle, as described.

2. An electric heater comprising an annular metallic case, an electric heating element within said case, a hollow handle at the outer edge of the case and through which the electric feed wires pass, a receptacle for the heater, a handle for the receptacle shaped to fit the heater handle and means to secure the heater handle to the receptacle handle, as described.

3. In an electric heater, a flat heating element, a handle therefor at the outer edge thereof, a handled receptacle in which heating element is adapted to be placed, a socket carrying electric feed wires and adapted to be inserted within the heater handle, and a slidable catch operated by the socket to secure the heater and receptacle together, as described.

4. In an electric heater, a flat heating element, a handle therefor at one edge thereof, electric feed wires passing through said handle, a handled receptacle within which the heater is adapted to be placed, means to secure the handle of the heater and the handle of the receptacle together, and a cage adapted to be placed within the receptacle upon the heating element, said cage having lugs to coact with the heating element to prevent it being displaced therefrom, as described.

5. In an electric heater, a flat annulus having an electric heating element therein, a handle at the edge thereof, electric feed wires passing therethrough, a receptacle within which the heater is adapted to be placed, a handle for said receptacle, a plug carrying electric feed wires and adapted to be inserted in the end of the heater handle, and a spring lock operated by the plug to lock the heater handle and the receptacle handle together when the plug is inserted in the heater handle, as described.

In testimony whereof I have hereunto set my hand this 13th day of April A. D. 1912, in the presence of the two subscribed witnesses.

ANSEL C. HULBERT.

Witnesses:
C. P. GRIFFIN,
L. H. ANDERSON.